United States Patent [19]

Schuller

[11] 4,362,146

[45] Dec. 7, 1982

[54] SOLID FUEL STOVE

[76] Inventor: Marius C. Schuller, 112 Cork St., W., Guelph, Ontario, Canada

[21] Appl. No.: 165,157

[22] Filed: Jul. 1, 1980

[30] Foreign Application Priority Data

May 12, 1980 [CA] Canada ................................. 351709

[51] Int. Cl.³ .............................................. F24C 1/14
[52] U.S. Cl. ...................................... 126/77; 126/61; 126/123; 126/287.5; 126/163 A
[58] Field of Search ...................... 126/77, 287.5, 132, 126/120, 121, 153, 163 A, 123

[56] References Cited

U.S. PATENT DOCUMENTS

| | | | |
|---|---|---|---|
| 563,005 | 6/1896 | Backus | 126/132 |
| 771,308 | 10/1904 | Horn | 126/120 |
| 1,951,265 | 3/1934 | Bauman | 126/153 |
| 2,361,796 | 10/1944 | Schrage | 126/163 A |
| 2,675,707 | 4/1954 | Brown | 126/287.5 |
| 2,936,724 | 5/1960 | Bishop | 126/77 |
| 3,168,088 | 12/1965 | Martin et al. | 126/77 |
| 3,981,292 | 9/1976 | Lilly et al. | 126/123 |
| 4,095,581 | 6/1978 | Bellmeyer et al. | 126/120 X |
| 4,112,913 | 9/1978 | Shimek et al. | 126/120 |
| 4,136,662 | 1/1979 | Willson | 126/77 |
| 4,140,101 | 2/1979 | Glover | 126/77 |
| 4,156,418 | 5/1979 | Berg | 126/120 |
| 4,192,286 | 3/1980 | Wormington | 126/121 |
| 4,210,119 | 7/1980 | Kincaid | 126/61 |
| 4,257,338 | 3/1981 | Chasek | 126/120 X |

Primary Examiner—Larry Jones
Attorney, Agent, or Firm—Lerner, David, Littenberg & Samuel

[57] ABSTRACT

A stove for burning solid fuel such as wood, coal or briquets in a more efficient manner utilizes preheated outside air for primary and secondary combustion and has tempered glass windows for observation. The combustion air flow is directed so as to minimize obscuring of the glass by deposits of unburned volatiles. A fire chamber is provided with self-feeding grate, and the stove also has a secondary grate, a high proportion of radiating and convective surfaces, a heat exchanger, a cooking surface, an automatic linkage between a fuel loading door and an opening-reducing damper to limit back drafts and thermostatic control to ensure complete combustion and efficient heat exchange. The self-feeding grate has a thermostatic grate shaker to promote unattended complete combustion, and can be replaced to match the fuel used.

56 Claims, 16 Drawing Figures

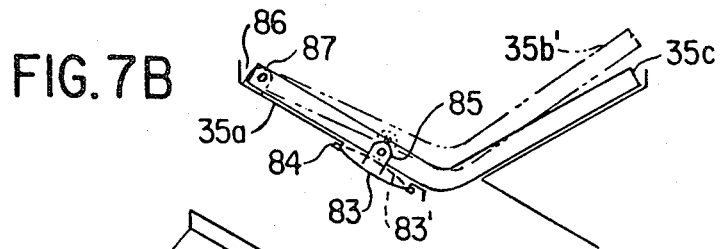
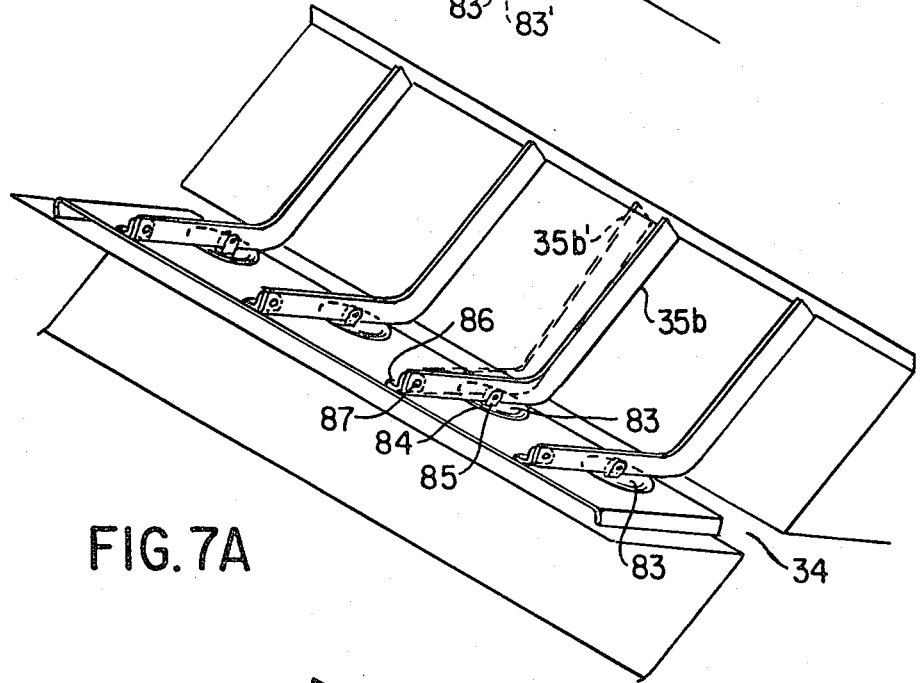
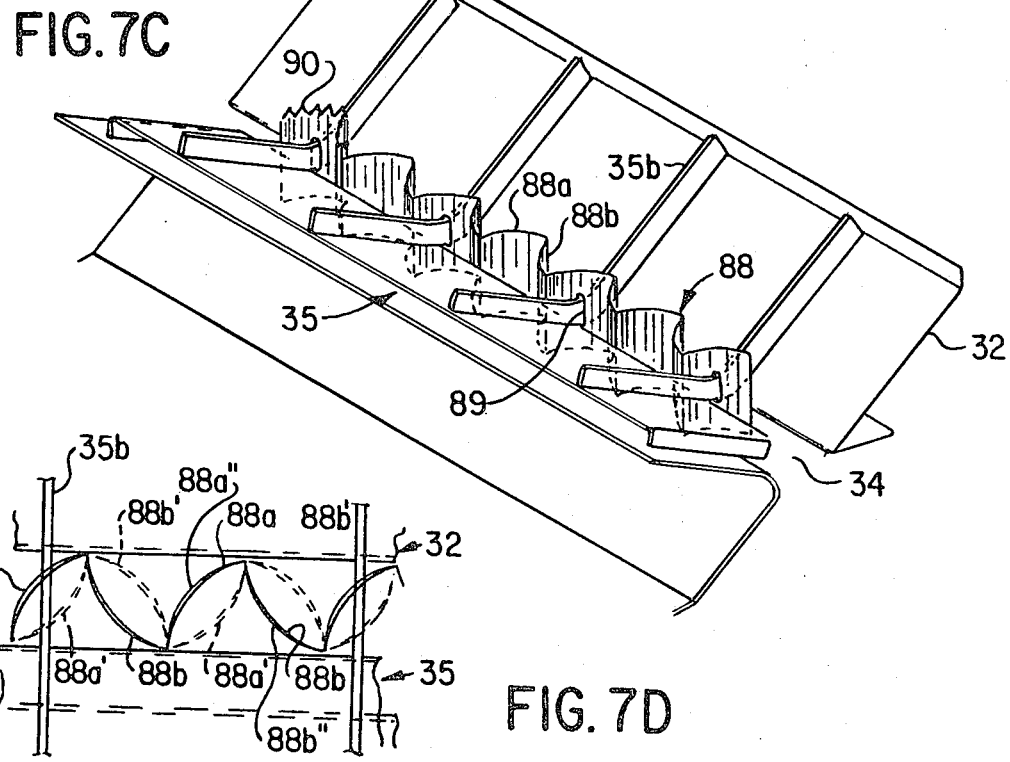

SOLID FUEL STOVE

FIELD OF THE INVENTION

The present invention relates to methods and apparatuses for burning solid fuel for domestic or space heating purposes.

PRIOR ART

Many different kinds of apparatuses and appliances are in general use for the burning of, e.g., wood or coal to provide heat in dwellings for comfort. Recently introduced types of appliances or stoves are frequently of the so-called air-tight construction with the object of being able to control the combustion rate of the fuel by means of accurately adjustable combustion air dampers, which in some cases are thermostatically controlled.

Some types also have tempered glass windows which allow the user to observe the fire in progress for enjoyment and to monitor fuel consumption.

The volume of most of these stoves and their ability to admit only a small flow of combustion air permit the user to charge a large volume of fuel into the stove and have continuous combustion for extended periods of time, e.g. overnight, which was not possible with earlier stoves.

Most types have one or more level top surfaces that can be used for cooking, particularly in cases of emergencies such as power failures, etc.

Many attempts have been made to improve the efficiency of these units, but with only limited success.

What defeats most of the attempts at efficiency is the size of the larger stoves. If the fuel load is supplied with adequate combustion air flows, the resulting heat emitted will raise the temperature in the average size living area to intolerable levels. This phenomenon is further aggravated by the fact that most modern dwellings are insulated in a far superior way than in the past and many of the rated output capacities of these stoves are well above that of a gas or oil fired furnace or other heating plane sized in a manner well known to those versed in the art.

As a result, most of these units are operated well below their full capacities, at reduced combustion air flow levels, and this in turn results in incomplete combustion, i.e. poor efficiency and a potentially dangerous deposition of condensing and precipitating wood-gas products in the flue pipe and chimney to which the stove is connected. Heat transmission in the colder parts of the stove is further impeded.

As means of extending stove life, many stoves have thick firebrick linings and are constructed from ¼" or 5/16" thick material, usually steel plate, sometimes cast iron. Although admittedly durable, the very thickness inhibits rapid heat transfer from the fire box/combustion chamber to the surface and thence to the room or space to be heated, allowing excessive escape of heat up the chimney.

Additionally, such material makes these units extremely heavy and cumbersome to transport and install, and makes seasonal removal impractical.

In most units, no additional radiating or convective surfaces are provided beyond the six basic surfaces of top, sides, front, back and bottom and the ratio between fire box volume and surface area approaches 0.5 for the larger units (this ratio is 6 for a one foot cube and 0.5 for a three foot cube).

Stoves equipped with glass observation windows suffer from a rapid 'smoking up' or soot deposition on the inside of the glass completely obscuring the flames within the stove to the viewer. This obscuring effect is accelerated with stoves operating inefficiently as described above.

If a window has a reasonably long 'clean-life', the combustion of wood is such that a brightly flaming fire is only visible for a limited time span since most burning pieces of fuel will quickly collapse in a bed of ashes, banking the coal and inhibiting the coaling process.

One of the most serious shortcomings of operating a wood burning appliance in modern homes is the lack of provision for adequate combustion air. Many units are difficult to light when cold since most dwelling units have a central furnace as the primary source of heat which, as it draws its combustion air flow from the interior of the house, creates a negative pressure in the house interior, which results in an inflow or downdraft of cold air through any chimney or unlit stove connected thereto. Enough heat has to be generated in the stove to cause a column of hot air to rise in the chimney to create the draft necessary for the adequate intake of combustion air. If and when this succeeds, the resulting loss of air from the room or house creates a negative pressure of its own which must by necessity be replaced by infiltration of cold air from the outside of the house i.e. as drafts around doors and windows.

Since a lot of emphasis is now being placed on the elimination of outside air infiltration in modern house construction by means well known to those versed in the art, it follows that often an adequate supply of combustion air to a stove is not readily available.

Many available units are not readily suited to convert existing open fireplaces, so that available chimneys often cannot readily be utilized for the much more efficient burning of solid fuel than is possible in these outdated devices.

OBJECT OF THE INVENTION

It is accordingly an object of this invention to provide a novel and improved stove which at least partly mitigates at least some of the foregoing disadvantages and promotes efficient operation.

BRIEF SUMMARY OF THE INVENTION

The present invention provides a stove comprising a lower chamber for containing ashes; an air inlet communicating with the lower chamber; an upper chamber forming a heat exchanger; a combustion gas outlet communicating with the upper chamber; a combustion chamber intermediate the upper and lower chambers; a fuel inlet opening into the combustion chamber; a door for closing the fuel inlet; a first opening between the lower chamber and the combustion chamber; a second opening between the combustion chamber and the upper chamber; the stove having an external surface defining recesses in the exterior of the stove between the chambers; the first and second openings extending between the recesses; and means within the combustion chamber above the first opening for supporting fuel during combustion, the supporting means defining gaps through which ashes and partially combusted fuel can fall through the first opening into the lower chamber.

BRIEF DESCRIPTION OF THE DRAWINGS

The invention will be more readily understood from the following description of preferred embodiments thereof shown in the drawings, in which:

FIGS. 7A, B, C & D show the main grates of FIG. 6 equipped with various types of thermostatic bimetallic shaking devices.

Figure 1:
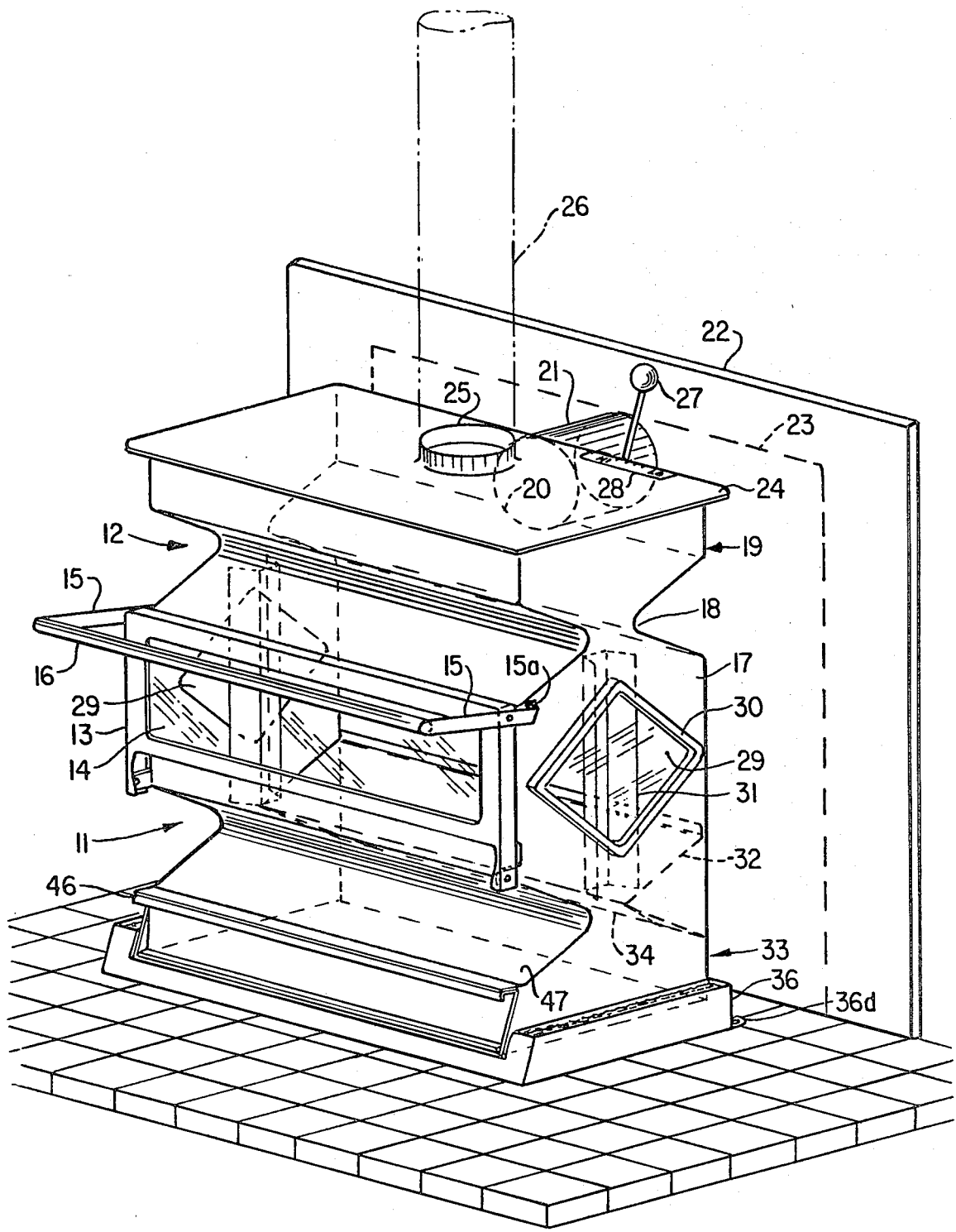
FIG. 1 shows a pictorial drawing of the front, side and top of a stove.

The stove of FIG. 1 is basically made up of two hourglass shaped sections 11 and 12, which are respectively a fire/ash portion and a heat exchanger/flue-outlet portion.

The double hourglass shape of the stove results in a very high surface area to volume ratio. In this embodiment, the total surface area is approximately 13 sq. ft. for a total firebox volume of approximately 1 sq. ft. In this embodiment, the firebox has steel side plates, between $\frac{1}{8}$" and $\frac{1}{4}$" thickness, the remainder of the firebox being steel of between 1/16" and $\frac{1}{8}$" thickness. The firebox has an overall height of 24", a width of 18" and a depth of 9". It will be understood that the stove parts can be equally functionally made of cast iron or other suitable materials and by methods well known to those versed in the art.

The size of the firebox is not essential to its operation and could vary by a factor of between 0.6 and 2 or more.

The frontal plane of a portion connecting the two hourglass sections is fitted with a fuel loading door 13 containing a tempered or other suitable glass pane 14 mounted in a gasketed channel around a fuel inlet opening and kept in a closed position by two latch bars 15, interconnected by handle 16. The handle 16 allows for single-handed opening of the door 13 and acts also as a guard rail against direct contact with the hot stove by loose clothing etc. Latch bars 15 hook behind projections 15a, attached to side walls 17. The necked-down portion 18 of the upper section 12 defines an elongate narrow opening 18a which extends the width of the stove and communicates with an upper chamber or heat exchanger 19 to which is attached at the back flue collar 20 forming a combustion gas outlet and, connecting the firebox by means of flue pipe 21 to a fireplace adaptor plate 22, covering fireplace opening 23 and thus making use of a fireplace chimney (not shown). It will be understood that flue pipe 21 could be directly connected into a chimney flue opening by means of either a horizontal or 90° elbow and vertical pipe. Alternately, top plate 24 of the firebox can be equipped with a vertically projecting flue collar 25 for direct vertical connection to flue pipe 26 and thence to a suitable chimney. This latter arrangement allows for a closer placement of the stove to a wall of a building. Top plate 24 can be readily used for cooking. A control lever 27 is fitted to the back of the heat exchanger 19 and its position is indicated by scale 28. The operation of this stove will be explained below.

The side walls 17 contain windows 29 covering openings in the side walls 17 and set in gasketed frames 30, the windows 29 being readily removable for replacement purposes. Visible through one of the windows 29 is one of a part of secondary combustion air channels 31. Visible through front window 14 is main rear grate 32 which, together with a front upper panel 47 of an ash drawer compartment 33, defines the necked-down portion 34 defining an opening 34a similar to the opening 18a. Ash drawer 46 is shown in a closed position inside a lower chamber or compartment 33. The stove is shown equipped with a combination hearth or floor heat-shield/humidifier 36 on a hearth.

Figure 2:
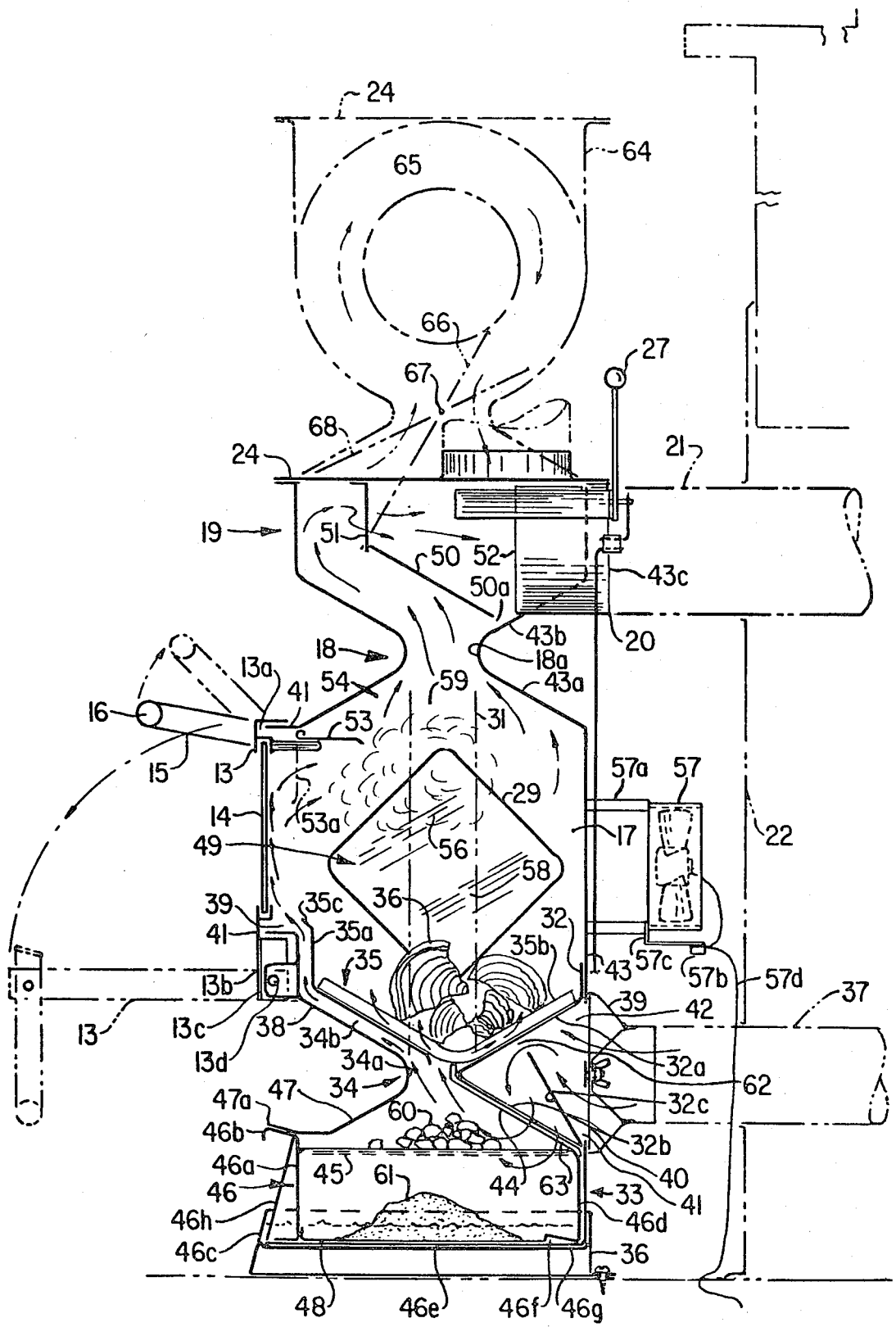
FIG. 2 shows a cross-section of the stove of FIG. 1.

Referring to FIG. 2, cold outside air is admitted through intake duct 37, through conical collar 39, through damper valve 40 and openings 41 into triangular channel 42, enclosed by back plate 43 and plates 32a and 32b forming parts of the main grate 32, and then over baffle 32c which is integral with main grate 32 and through triangular openings 44 at the ends of plate 32b into ash drawer compartment 33 then through full length opening 34a and grate bars 35b of a grate liner unit 35 supporting fuel 36. A portion of this air also flows into gap 34b between firebox liner 35a and firebox front plate 38 and exits through opening 39 near the lower edge of glass pane 14 set in doorframe 13 having a gap 13a around its perimeter containing a glass fibre or asbestos gasket, engaging throat 41 of the stove front when the door 13 is in the upright or closed position and forming a substantially air-tight seal therewith. Door 13 is hinged by pins 13c and hinge brackets 13b and 13d respectively attached to door 13 and plate 38. Compartment 33 contains ash drawer 46 which has attached to it the secondary grate screen 45. Drawer 46 is made up of front plate 46a equipped with sloping upper lip/combination pull-out handle 46b which engages matchingly sloped edge 47a forming a continuation of compartment top front plate 47.

Drawer front 46a also has a horizontally projecting lip 46c which engages a horizontal extension of stove bottom 48. Front 46a is closely fitted between side plates 17. The foregoing results in an essentially airtight, metal-to-metal seal between drawer and stove. Drawer 46 is further made up of sides 46d carrying screen 45 and a bottom 46e equipped with a stiffening rib 46f and a tapered ash entrance lip 46g which, when the unit is inserted into compartment 33, will scrape any ashes left on bottom plate 48 into the drawer interior 46h. It will be understood that unit 46 has no back. This allows for the aforementioned action as well as allowing the contents to be emptied without removing screen 45. Combustion of fuel 36 takes place in combustion chamber 49. Hot combustion products rise through opening 18a into heat exchanger 19, flowing over all the interior sides of the interior of the combustion chamber 49 and of heat exchanger including the underside of stove top plate 24, being forced to travel around full width baffle 50 and diverted by a partial vertical baffle 51 attached to top 24, to the ends of heat exchanger 19 and back over inside of back plate 43c and lower back plate 43b and finally through opening 52 into flue collar 20 and flue pipe 21 connected to the fireplace adaptor plate 22. Collar 20 projects partially into heat exchanger 19. Baffle 50 is equipped with a small opening 50a directly in line with flue collars 20 and 25, allowing any creosote buildup to run back into the fire.

A full width baffle 53 is pivotably mounted on pins 54 and is normally held in a horizontal position by a finger 55 attached to door 13. When door 13 is opened, fingers 55 will retract and baffle 53 will assume a vertical position 53a thereby reducing the effective door opening and minimizing the escape of smoke into the room by virtue of a principle well known to those versed in the art. In another embodiment, plate 32c is arranged to act as a damper to cover openings 44 by pivoting about the apex of plates 32c and 32b. A pivot shaft at that point projecting through side wall 17 and fitted with a short crank arm can be connected to door hinge bracket 13b by a simple linkage, so that on opening of door 13, the air intake is shut off, inducing intake flow through the door opening.

In operation, a portion of the combustion air flow is ducted under liner 35a over the entire width of the unit into the vicinity of the lower edge of window 14 by means of gap 39 and deflector edge 35c. This relatively clean and smoke-free airflow, preheated first in channel 42, secondly by coals 60 on screen 45, and thirdly by liner 35a, heats the glass moderately and uniformly, minimizing thermal shock and keeps the glass clean of smoke and creosote deposits by its upward washing action; as it is deflected by upper edge of throat 41 and baffle 53, it becomes an effective preheated secondary combustion air supply for the combustion of volatiles shown at 56.

Figure 6A:
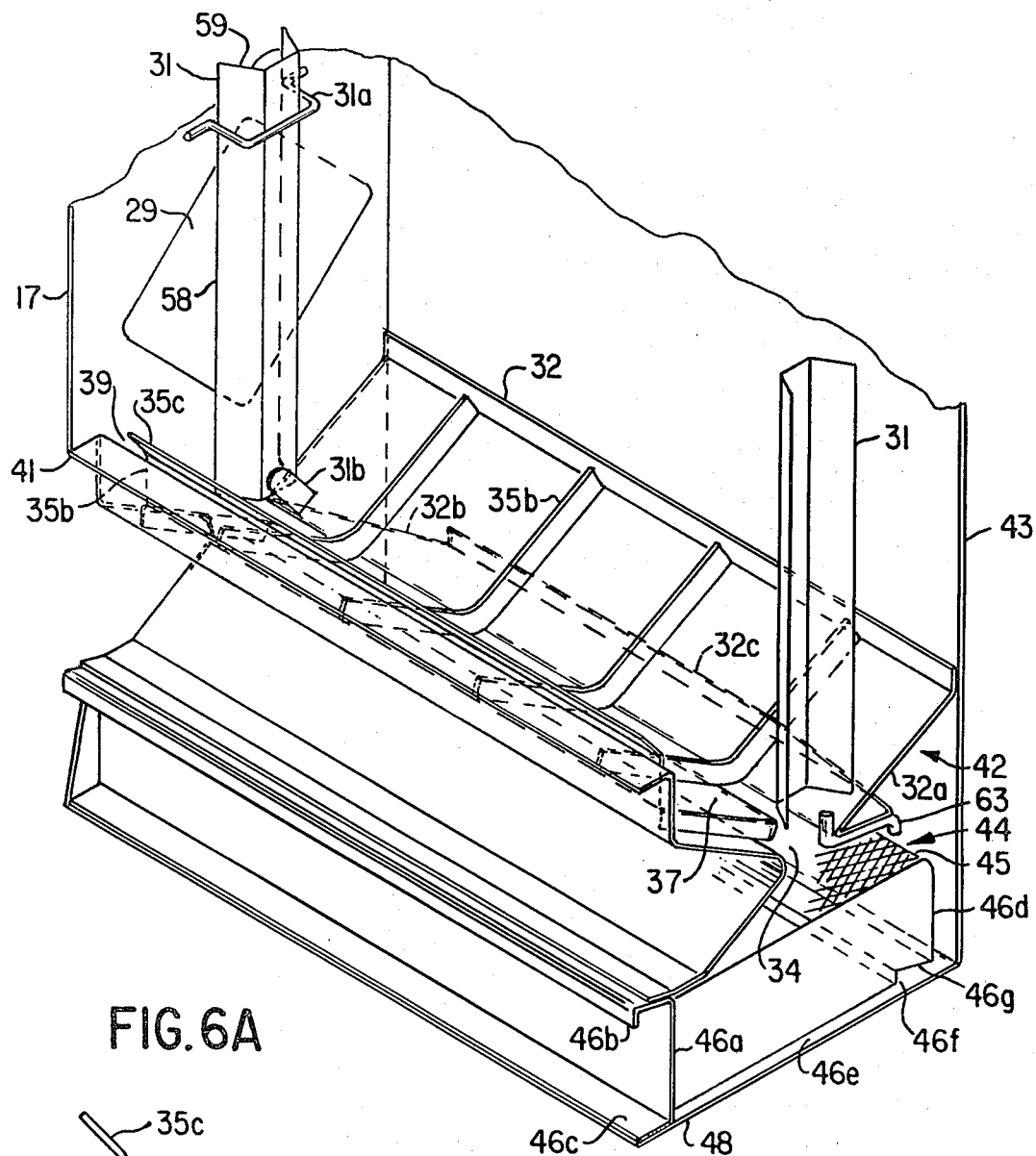
FIGS. 6A & B show a view of the interior of the stove of FIG. 1, illustrating in particular, main and secondary grates and combustion air flow channels.

A similar provision is made for end windows 29, by vertical channels 31. Some combustion air rises through opening 34a into these and since windows 29 are mounted against the outside of end plate 17, a gap 58 exists on either side of channel 31, allowing preheated, clean air to wash over windows 29; as the air exits at opening 59, now further preheated by this passage, it provides secondary combustion air near opening 18a. This is also illustrated in FIG. 6A.

The main grate bars 35b support wood-fuel pieces 36 and keep them from contacting plates 32a and 35a, thus allowing combustion air flow freely underneath fuel 36 and providing thorough and lively combustion. As the combustion proceeds and coaling begins, small pieces 60 will fall through opening 34 onto screen 45, directly into the path of the inrushing preheated combustion air entering through openings 44. The proximity of coals 60 to gap 34 and fuel 36 promotes continued combustion by virtue of the radiated and convected heat. It will be clear that grates 32 and liner 35a constitute a self-feeding grate arrangement; as the fuel 36 is consumed, it will rotate and slide by gravity towards center opening 34, resulting in thorough and lively combustion. As coals 60 burn up, ash 61 will fall through screen 45 and collect in drawer 46. The hot combustion gases rise through heat exchanger 19 and as previously explained, are forced into contact with all surfaces of same over its entire width, to promote rapid heat exchange with the room air, aided by the relatively thin walls of heat exchanger 19. The shape of unit 19 is extremely rigid and resists buckling, this is also eliminated by the very uniform distribution of heat. The short baffle 51, attached to the removable top plate 24 further enhances full width flow to the ends of heat exchanger 19. The continuous heat exchanger between cold combustion air and plates 32a and 35a, inhibits the 'burning out' of same and in any case, both can be readily removed for inspection and replacement. To further promote heat exchange by means of convection, a small fan or fans 57 are mounted some distance from back plate 43 on spacer 57a and are equipped with a thermostatic switch 57b carried on bracket 57c capable of switching power through cord 57d to fan 57 when a temperature of between 140° and 180° F. is reached and to shut off power when temperature drops below this range.

The triangular intake air preheating manifold 42 is defined by plates 32a and 32b and the unit back plate 43 to which the conical intake collar 39 is attached. The ends of manifold 43 are defined by the unit end plates 17. Plate 32a is the main grate rear plate and is formed in one piece with combustion air distribution plate 32b and baffle 32c which is inclined so as to promote the flow of cold intake air through gap 62, running the full width of the stove, into close contact with underside of plate 32a allowing efficient heat transfer to the combustion air. Openings 44 are formed by having the corners cut from the developed plate 32. The formed unit is removable for replacement purposes and rests inside the unit on bars 63 diagonally attached in the rear corners. Placement of the openings 44 is such that the air flow is divided after entering through collar 39 and flows to either end of duct 42, heating up as described above.

Figure 3:
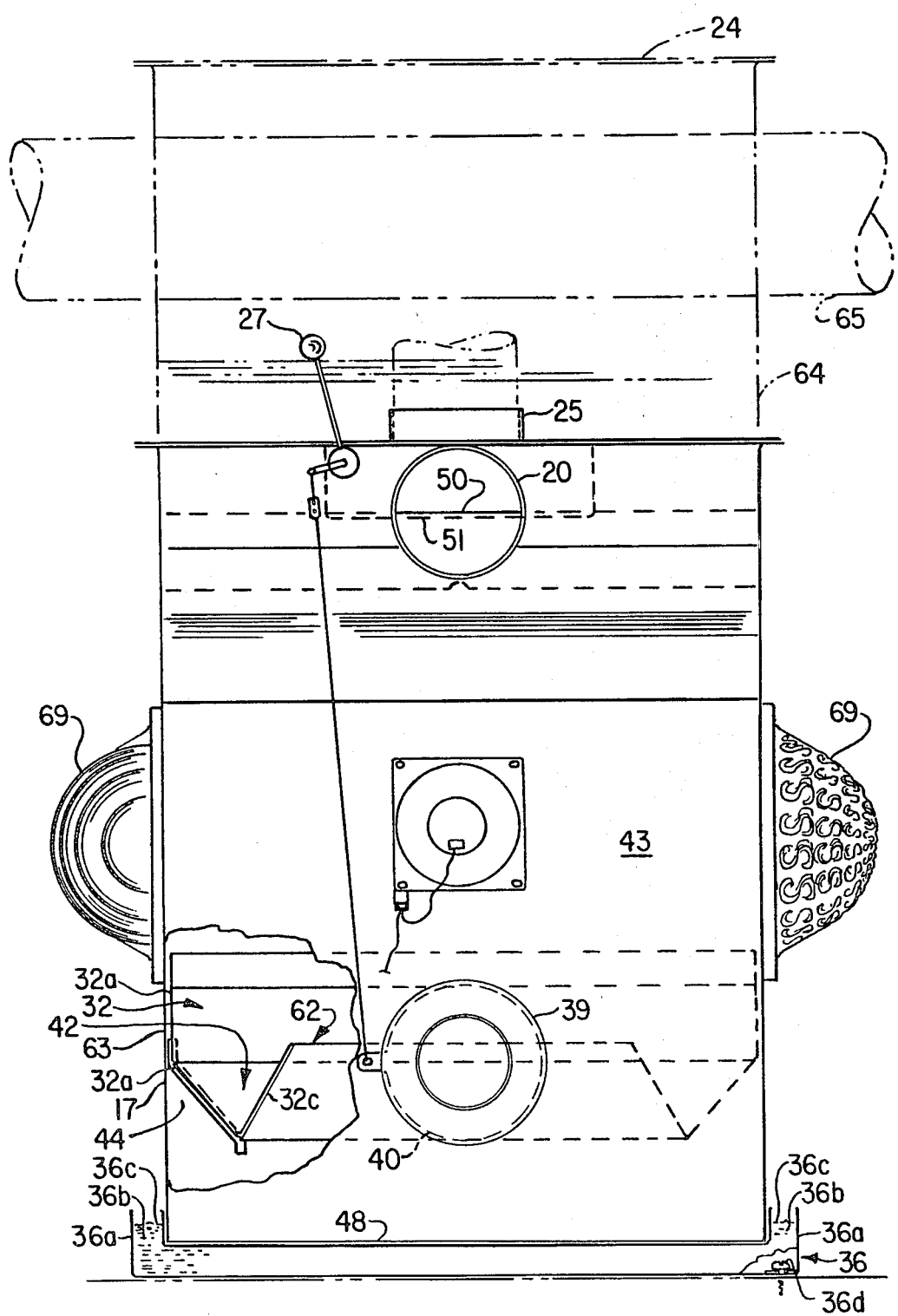
FIG. 3 shows the back of the stove of FIG. 1.

The foregoing is also clearly visible in the rear view of the unit shown in FIG. 3. Back plate 43 is partially cut away to show the end of the grate 32 and duct 42 arrangement. FIG. 3 also shows the general arrangement of control unit 27, an add-on heat exchanger 64 covered by the unit's top plate 24 and a forced air connection duct 65 running through the centre of 64 to allow heated air to be conveyed to adjoining rooms or areas of a dwelling. Heat exchanger 64 and duct 65 are also shown in FIG. 2. A damper 66 pivoting around pin 67 and equipped with an external handle fitted to same, projects down into heat exchanger 19 to touch baffle 50, thereby ensuring flow of combustion heat around duct 65 in the direction of the arrows. For ease of starting a fire in the unit, baffle 66 can be rotated to position 68 to allow a more direct draft to flue pipe 21.

Referring again to FIG. 3, this also shows the arrangement of baffles 50 and 51 and of combination heat shield/humidifier 36, which is essentially a shallow duct or water container of approximately 1" height, as wide as or wider than the depth of unit bottom plate 48, and extending a length equal to or greater than the width of the bottom plate 48 and terminating at both ends in upturned portions 36a having an upwardly open top 36b adjacent the periphery of the lower chamber to allow for refilling by watering can, observation of water level 36c and, of course, exit of water vapour for humidification purposes. The evaporative heat required for this helps keep wood floor and floor joists below the unit cool and safe from formation of pyrophoric carbon and its attendant fire hazard.

Even if the water is not replenished in time, this unit would provide an air circulating duct below the stove as well as two additional layers of steel, affording at least basic protection. Unit 36 is also provided with floor attachment lugs 36d to prevent the stove which is closely fitted between uprights 36a from moving around during fuel loading, poking or accidental bumps.

Also shown in FIG. 3 are dome-shaped or hemispherical convection radiation chambers 69 fitted in place of end windows 29, that can be used where less direct radiant heat such as exits through glass can be tolerated due to e.g. installation clearances. Hemispheres 69 are one piece units formed of metal, glass, ceramic or other suitable material with a transition to a square flange equal in size to glass 29. They can be deeply ribbed vertically or richly embossed, as shown on opposite ends, to add additional surface area to promote rapid heat exchange with the room. Their projecting position into the natural convection currents enhances this further.

Figure 4B:
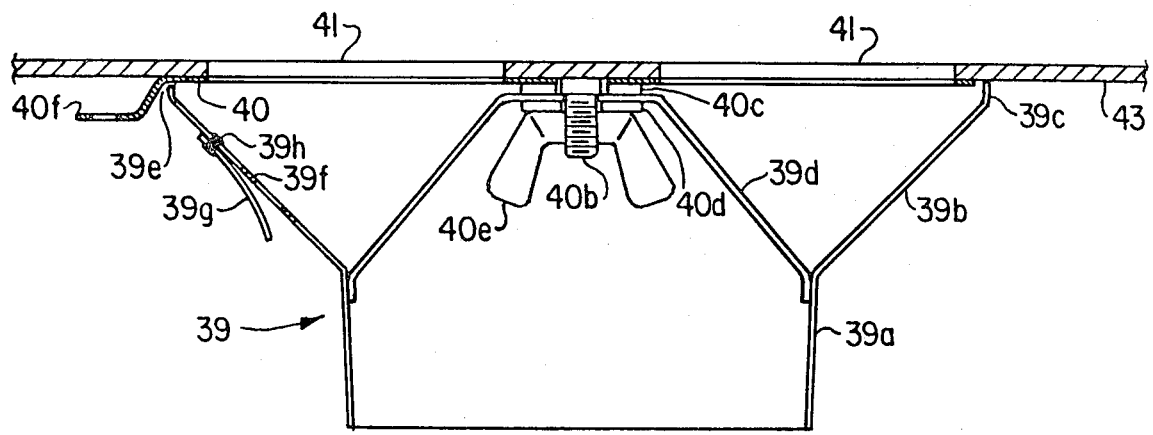
FIGS. 4A & B show a combustion air intake damper arrangement.
Figure 4A:
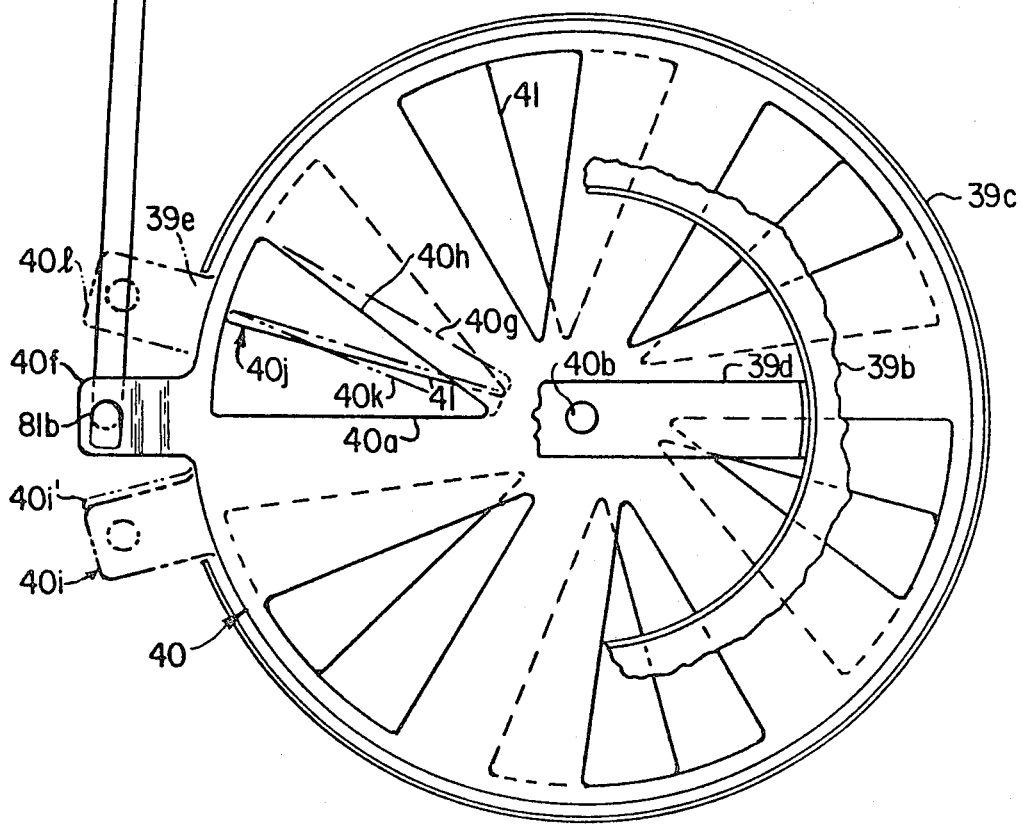

Referring to FIG. 4A, this shows the intake damper 40 in detail. In this embodiment, six sector shaped openings 41 in rear plate 43 are matched by six identical openings 40a in circular plate 40, being rotatably mounted on stud 40b, welded to back 43 and as shown in FIG. 4B being held in close contact with washers 40c and 40d, accommodating mounting bracket 39d of intake collar 39, and being held in place by wingnut 40e.

Referring again to FIG. 4A, opening and closing of opening 41 is affected by rotating plate 40 by means of a control rod 81 connected to tab 40f. Openings 41 and 40a are shaped so as to permit accurate control of combustion air flows at the lower end of the control range which will now be explained.

The sector shaped openings 40a, have only one radially oriented edge each. If both edges were so oriented, the upper one of opening 40a would be at 40g. Instead, it is offset by a small distance nearest the center of disc 40 and is located at 40h. When damper 40 is in the closed position with the tab 40f in the position shown in broken lines at 40i, the blank portion of plate between openings 40a will cover openings 41 completely. When the damper control is actuated and control rod 81 moves up a small distance, rotating tab 40f to position 40i'; edge 40h will rotate clockwise across the leading edge of the corresponding hole 41 and open only a small triangular area 40j instead of an area 40k' the full length of radial edge 40g, had it been so constructed. Area 40j is only about 1/5 of the area of 40k for the same rotation of plate 40, thus accurate flow control is obtained.

When the control rod 81 is actuated for full flow in an upwards direction, tab 40f attains position 40l and now openings 41 are completely uncovered by virtue of having openings 40a in a matching relationship with same. Rod 81 is kept in place by a simple joggle 81b fitted through tab 40f.

Referring to FIG. 4B, this shows a section through the center of FIG. 4A,. Intake cone 39 is comprised of tapered collar 39a, a conical transition 39b and flange 39c. A bracket 39d, attached to 39a, keeps the unit tightly pressed against back plate 43 by means of wingnut 40b, as previously described. A partial radial opening or cut-out 39e of flange 39c allows tab 40f to project through to the outside of intake 39. Collar 39a can be readily connected by means of intake duct 38 shown in FIG. 2 through fireplace adaptor plate, shown in FIG. 1, to a suitable intake grill on the exterior wall of the dwelling. Fitting 39 also has two or more fresh air supply ports 39f, closed by bimetal strips 39g attached with rivets 39h. The bimetal strip is such as to curve away from holes 39f when a suitable temperature has been reached in the fire chamber of the appliance. Flow will be proportionally compensated by outside air temperatures as an equilibrium is reached at any given time. Fresh air entering the room is carried past back of unit by convection currents.

Figure 5B:
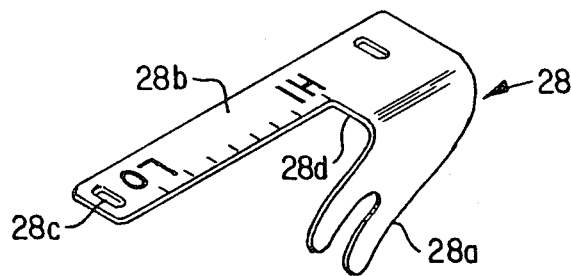
FIGS. 5A 5B and 5C show a damper control arrangement.
Figure 5A:
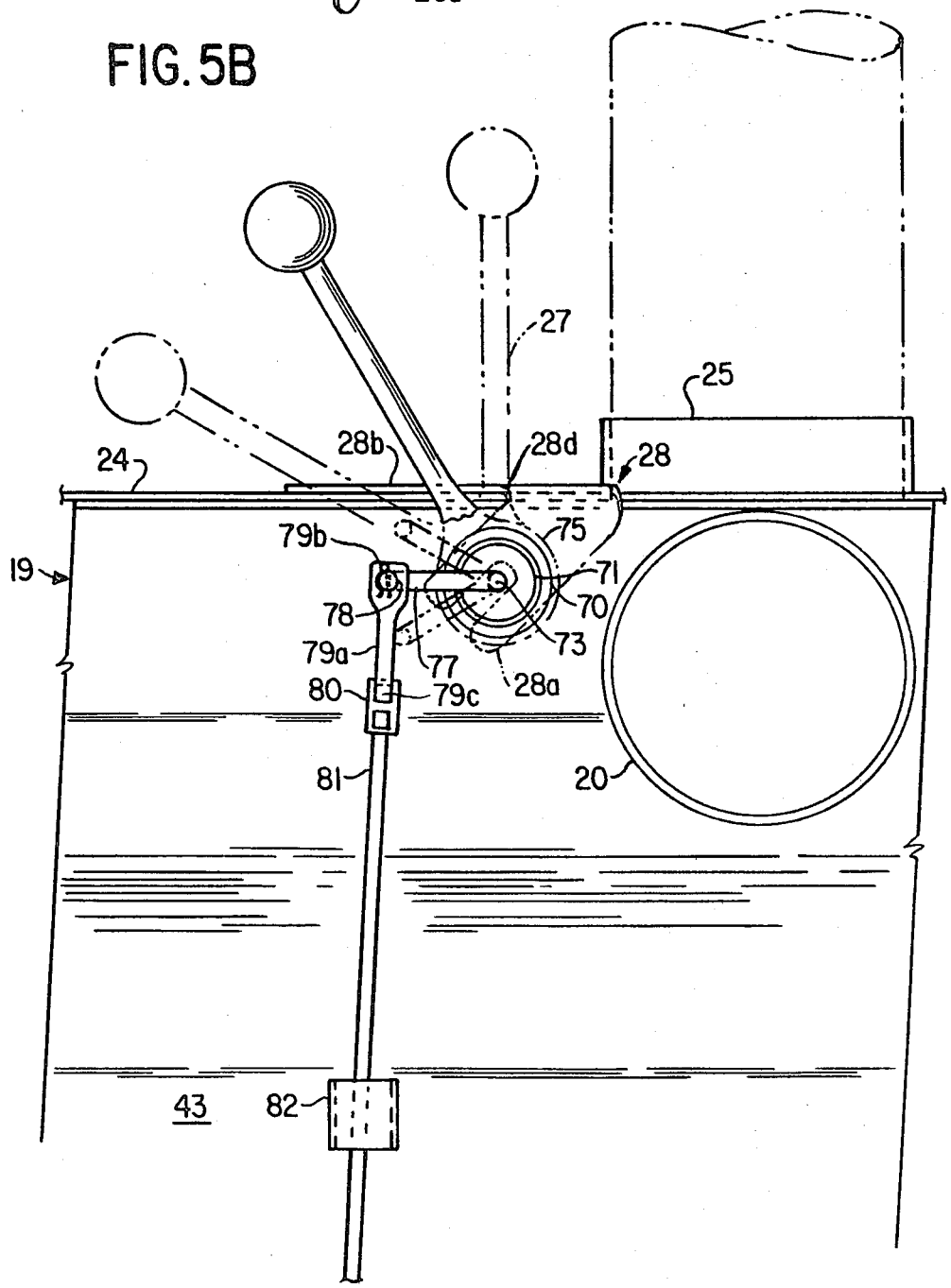
Figure 5C:
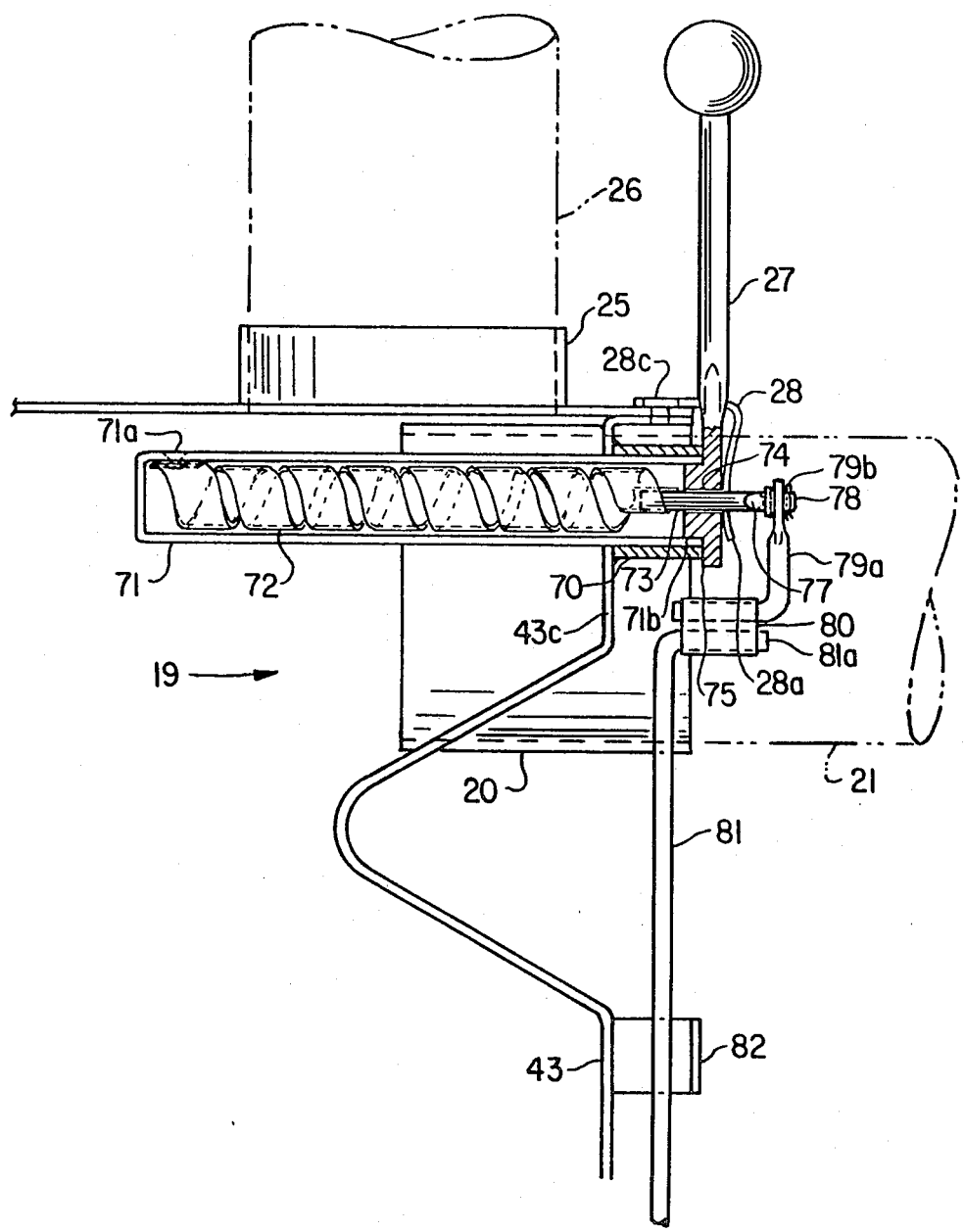

Referring now to FIG. 5A and 5C, these show the general arrangement of heat control by virtue of sensing the heat of combustion in heat exchanger 19 and a mechanism to open or close the combustion air intake damper 40 accordingly. A cylindrical fitting 70 is attached in close proximity to both flue collars 20 and 25 and just below cover 24 in the rear plate 43c of heat exchanger 19; both ends of cylinder 70 are open. A tube 71 with one closed end, is rotatably mounted through fitting 70 and is securely fastened by any of a number of well known methods to control hub 75. The assembly of 71 and 75 can turn freely in fitting 70. Tube 71 contains a helically wound bimetal coil 72, fastened near the closed end of 71 with rivet 71a and is attached at its other end to control shaft 73, rotatably mounted through hub 75. Hub 75 is provided with a handle 27 having at its upper end a knob of Bakelite or similar heat resistant material. The entire assembly 71, 72, 73, 74 and 27 is kept in place by bracket 28, shown in FIG. 5B, which is mounted by means of two openings 28C, slotted in parallel relationship to tube 71, to matched holes in the upper flange of heat exchanger 19 and cover 24, and having a forked flat spring portion 28a projecting down and at an angle, to press hub 75—by virtue of pressure on either side of shaft 73—against fitting 70. This arrangement allows for periodic removal and maintenance or tightening of the entire control unit.

In operation at e.g. the medium control setting shown in FIG. 5A, the heat produced by a combustion in the stove will cause the bimetal helix 72 to remain at a given state of helical expansion so long as the fire produces a given amount of heat resulting in a given temperature in heat exchanger 19.

If the temperature were to rise by ignition of hitherto unburned fuel etc. the coil 72 will cause the control shaft to rotate counterclockwise so as to move the crank arm 77 attached to shaft 73 downwardly. Crank 77 is equipped with pivot 78 to which is fitted the upper control rod 79a, held in place by hairpin clip 79b and having a horizontal portion of square cross-section 79c fitted in a fusible link 80 to a horizontal portion 81a of square cross-section, of lower control rod 81 which at its lower end is attached to damper 40 as previously described, and in doing so will rotate the damper shut in accordance with the degree of heating experienced in heat exchanger 19 and thus diminish the supply of combustion air to the fire and thereby reduce the rate of combustion. Thus the fire is automatically controlled at the pre-set rate. Varying positions of control lever 27 will result in the fire being controlled at correspondingly varying rates.

Portion 28b of bracket 28 is marked to indicate the range of control. The horizontal portion of finger 28a acts as a stop for lever 27 at edge 28d. Fusible link 80 is provided in case either coil 72 or shaft 73 seize or otherwise fail to operate, allowing the unit to burn its fuel charge in uncontrolled fashion. In such a case, the vicinity of heat exchanger 19 will rise to such extreme temperatures that fusible link 80 will melt, allowing the weight of rod 81 to cause the damper 40 to rotate shut and thus exclude combustion air from the unit and effectively extinguish the run-away combustion taking place. Rod 81 will be kept upright for this purpose by a loose fitting keeper 82 attached to unit rear plate 43.

Referring to FIG. 6A, this is a pictorial drawing of the interior of the fire chamber and particularly the main grate 32 and liner assembly 35. Reference may be made to the description pertaining to FIGS. 2 and 3. Secondary combustion air preheating channels 31 are shown loosely mounted in 'U' brackets 31a attached to end plates 17 and kept in place at the bottom by keeper 31b attached to main grate 32. This allows for ready removal for cleaning. Channel 31 also acts as a guard for the inside of glass 29.

Figure 6B:
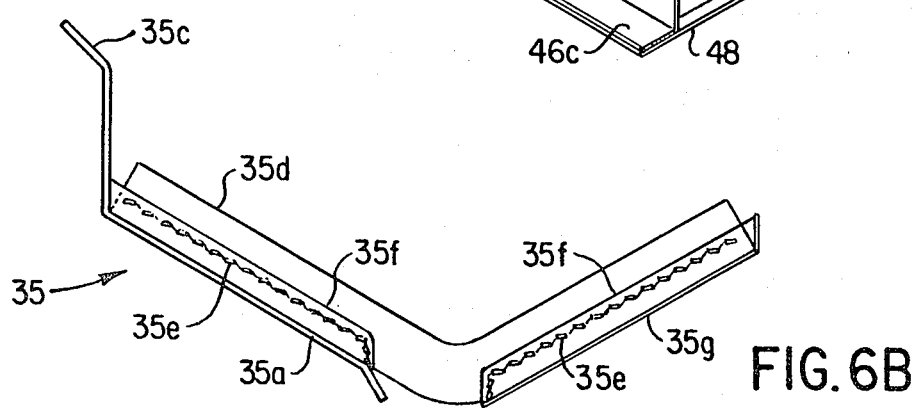

In another embodiment of liner 35 as shown in FIG. 6B, provision is made for the use of a refractory cast-in-place lining. Here, unit 35 is equipped with somewhat higher grate bars 35d and an expanded metal screen 35e attached between them parallel to liner plate 35c. This allows a castable refractory 39f to be installed to the height shown, being anchored to the whole by screen 35e. Since no liner plate exists on the main grate side of unit 35, a refractory pin 35g is attached to grate bars 35d at that side under a similar screen 35e and thus also suitable to having a refractory material 35f cast in place. A refractory lining would improve the service life of the grate and liner.

FIG. 7A shows a thermostatic bimetallic grate shaking arrangement. Liner plate 35a is equipped with a bimetallic snap-action disc of a type well known to those versed in the art. Reference should also be made to FIG. 7B. Bimetallic disc 83 is loosely held in annular groove 84 formed from or attached to plate 35a. Bracket 85 is attached to the centre of disc 83 and is pivotably connected to grate bar 35b which in turn is pivotably mounted to bracket 86 by means of rivet 87. In operation, the disc 83 will heat up from the effect of the fire in the grate and snap to a shape shown as 83' and in doing so, snap bar 35b sharply to position 35b'. As the fire heats and cools relatively across the width of the entire unit, the bars will snap up and down accordingly, thereby disturbing a small amount of fuel and ash which may have blocked the combustion air flow in that area, causing that area to cool. Thus the snapping of the disc will revive the fire there. If, on snapping up to position 35b' a small piece of fuel would become lodged under the bar 35b, that would only result in the entire assembly 35 being shaken on the bar snapping back. This is possible since the liner assembly rests free in the unit. FIGS. 7C and 7D show another type of thermostatic shaking device. Here a continuous bimetallic strip 88 is formed in alternatively concave and convex curved sections 88a and 88b. Since the ends of these sections are held firmly between the edge of grate 32 and liner 35, heating and cooling by virtue of the process described above will cause these sections to snap to positions 88a' and 88b' as shown in FIG. 7D. To enhance the snap action, each portion 88a and 88b is formed with some compound curvature 88a'' and 88b'' in its generally cylindrical shape and thus have a small amount of spherical dish. Disturbance of fuel and ash now takes place only directly over opening 34. This action could be enhanced by placing sharp teeth 90 along the entire top edge of strip 88.

The shaking element 88 is held in place vertically by slots 89 punched to accommodate the grate bars 35b on which the entire unit 88 can be readily installed or removed since, again, liner 35 is removable.

Figure 8A:
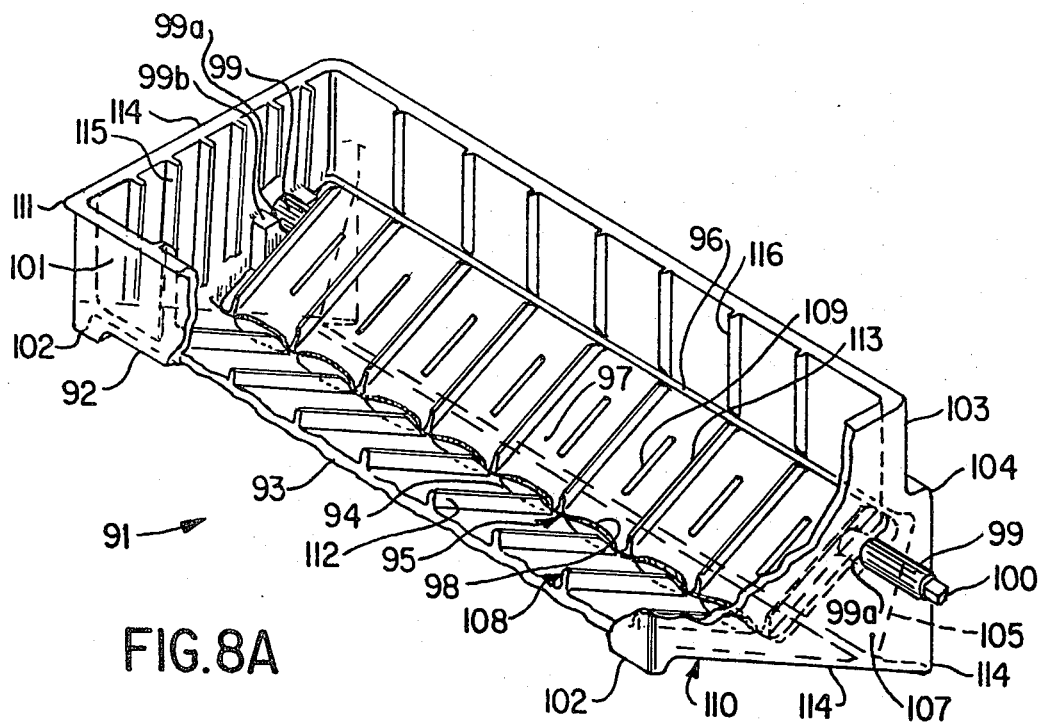
FIGS. 8A & B show the arrangement and cross-section of a coal burning grate.
Figure 8B:
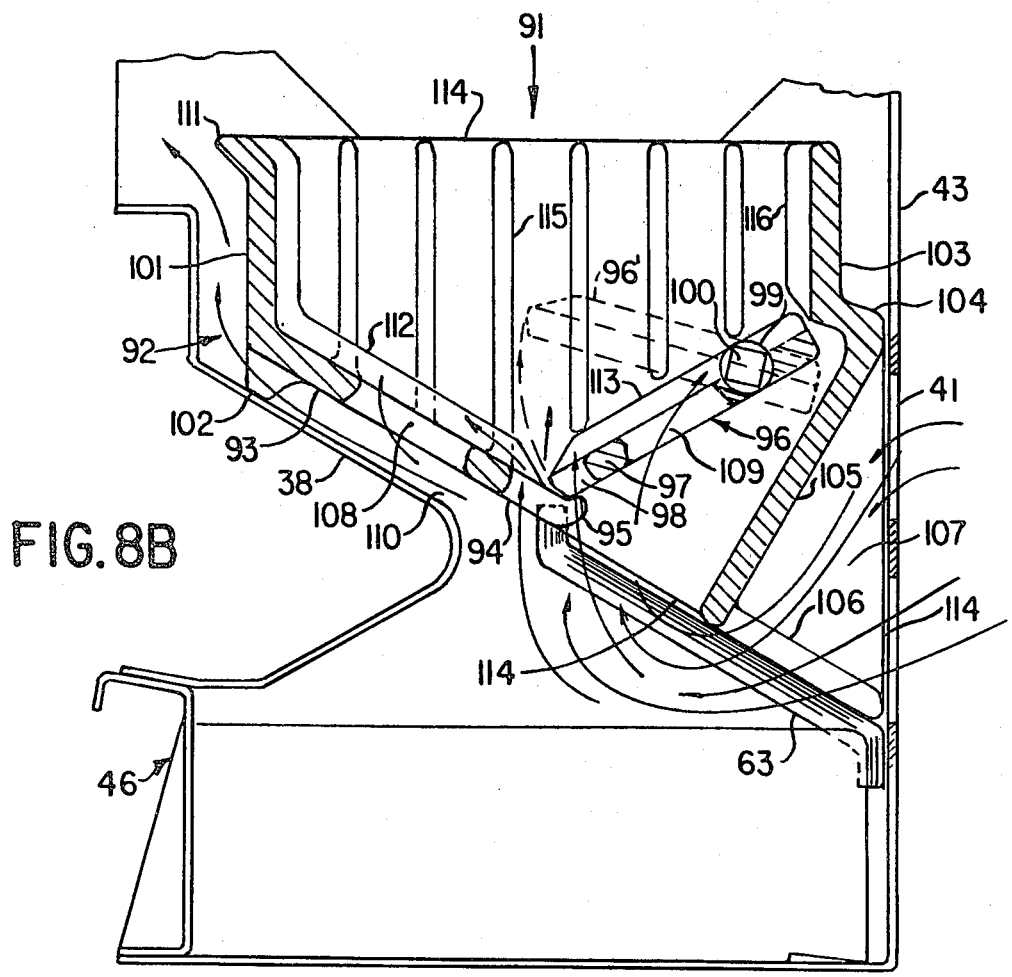

FIGS. 8A and 8B show a coal burning grate arrangement 91 which may be installed simply by inserting it through the door opening after grate 32 and liner 35 have been removed. The generally higher temperatures encountered in the combustion of coal necessitate this unit to be constructed from cast iron or an equivalent material. The grate consists of a basket 92 with a sloped bottom plate 93 with, at its lower end, scalloped openings 94 and upturned projections 95 between these openings. Movable grate plate 96 consists of plate 97 having scalloped openings 98 in matched relationship with openings 94 and the projections between openings 98 rest on projections 95. As grate 96 is pivotably mounted by pivot 99 through holes 99a in side plates 114 at one side and by a stub pivot shaft 99c journalled in an upwardly open support 99b at the opposite side and is equipped with square key end 100 and as key 100 will project through a hole in side plate 17 of stove being in matched relationship with hole 99a, grate 96 may be rotated or shaken using a tool well known to those versed in the art, to position 96' and thus agitate and shake the fire or empty the coals into drawer 46. At rest on projections 95, grate 96 is inclined to an angle equal to that of fixed plate 93. The basket 92 further comprises front plate 101 and legs 102, which resting on steel grate plate 38, will result in a gap 110 between the sloped and vertical portions of the basket and plate 38. Back plate 103 has a projecting ridge 104 which keeps plate 103 in spaced relationship with stove steel back plate 49. A sloped extension 105 over the full width of the unit and a partial width baffle 106 in the area of intake openings 41 define a triangular combustion air preheating duct 107. In operation, combustion air flowing in through openings 41 is preheated and ducted in much the same fashion as previously described in FIGS. 2 and 3. This air now enters the combustion zone through the combined scalloped openings 94 and 98 and flows as well through slots 108 and 109 in plates 93 and 97 respectively. It also flows into gap 110 between basket 92 and plate 38 and exits at top of plate 101, being deflected by edge 111 in much the same fashion as described before in regards to FIG. 2 and liner assembly 35. Plates 93 and 97 are provided with transverse ribs 112 and 113 respectively, closely spaced along the length of these plates to support the coal above the air passages between the ribs, ribs 112 continuing vertically up the inside of front plate 101. Sides 114 and back 103 are provided with vertical ribs 115 and 116 respectively for the same purpose. Sides 114 extend downwards towards the back plate 43 and form the ends of duct 107, and form the base of the basket 92 and transfer its weight to diagonal corner support bars 63 previously used to support grate 32. By virtue of this arrangement and its relationship with legs 102 on the front, the entire assembly tends to wedge tightly against back 43 ensuring reasonable air tightness therewith.

I claim:

1. In a stove comprising a housing defining a combustion chamber, said housing being provided with a window through which said combustion chamber is visible from the exterior of said stove, means defining an inlet for admitting an inflow of air into said combustion chamber, means for supporting fuel for combustion in said combustion chamber and means for directing a portion of said air inflow upwardly past a surface of said window facing inwardly of said combustion chamber, the improvement comprising means for deflecting said air inflow portion from said inlet opening under and in contact with said fuel support means for preheating said air inflow portion prior to arrival thereof at said window surface.

2. A stove, comprising:
means defining a combustion chamber;
grate means in said combustion chamber for supporting fuel to be combusted;
said combustion chamber defining means comprising a vertical window in the front of said stove through which the combustion chamber is visible from the exterior of said stove;
a horizontal inlet opening located under said grate means at the bottom of said combustion chamber for the inflow of air into said combustion chamber through said grate means;

a horizontal outlet opening at the top of said combustion chamber for the outflow of gases from said combustion chamber;

said inlet and outlet openings, said grate means, said combustion chamber and said window being elongate in the direction of the width of said stove;

an air inlet communicating with said inlet opening for supplying the air thereto;

means for controlling air flow through said inlet; and means in said combustion chamber for deflecting portion of the air upwardly past the face of said window directed inwardly of said combustion chamber.

3. A stove as claimed in claim 1, wherein said air flow directing means extends the width of said window.

4. A stove as claimed in claim 1, further comprising duct means for supplying said air flow to said stove from the out-doors atmosphere.

5. A stove as claimed in claim 1, including means below said support means for receiving embers which drop from said support means and means for passing said air flow past said embers to said inlet for preheating of said air flow by said embers.

6. A stove as claimed in claim 2, wherein said air inlet comprises means for causing preheating of the air by combustion of fuel within said stove prior to passage of the air through said inlet opening.

7. A stove as claimed in claim 2, further comprising a lower chamber beneath said combustion chamber and communicating through said inlet opening with said combustion chamber for supplying the air into said combustion chamber and receiving embers from said grate means, said air inlet comprising an air duct extending along the exterior of said combustion chamber adjacent said grate means and communicating with said lower chamber for supplying the air in a preheated condition to said lower chamber and said air deflecting means comprising means for passing said air portion adjacent said grate means for heating of said air portion prior to arrival of said air portion at said window.

8. A stove as claimed in claim 2, further comprising means for regulating said air flow.

9. A stove, comprising:
a firebox defining a combustion chamber;
a primary combustion air inlet communicating with said chamber;
means for controlling the inflow of air through said air inlet into said chamber;
a combustion gas outlet communicating with said chamber;
means for supporting fuel for combustion within said chamber;
said firebox being provided with a window through which said chamber is visible from the exterior of said firebox; and
means defining a secondary combustion air flow passage extending under and in contact with said fuel support means for deflecting secondary combustion air from said primary combustion air inlet past said fuel support means for preheating said secondary combustion air and past a surface of said window facing inwardly of said chamber, whereby the deflected air counteracts deposition of combustion products on said window surface.

10. A stove, comprising:
a firebox defining a combustion chamber;
means for supporting fuel in said combustion chamber during combustion of the fuel;
means defining a fuel inlet opening in said firebox for insertion of the fuel into said combustion chamber;
door means for closing said fuel inlet opening;
an ash receptacle beneath said fuel support means; said fuel support means comprising means defining an ash opening therein through which ash can fall downwardly to said ash receptacle, and fuel support bars downwardly inclined towards said ash opening at opposite sides thereof for promoting movement of the fuel under gravity towards said ash opening;
a combustion air inlet communicating with said ash receptacle to provide an upward combustion air flow through said ash opening;
plates downwardly inclined towards said ash opening;
one of said plates forming part of a duct means for deflecting part of said air flow beneath said fuel support means to provide a flow of preheated secondary combustion air to an upper region of said combustion chamber to promote secondary combustion; and
auxiliary fuel support means in said ash receptacle for supporting partially combusted fuel in the air flow below said ash opening to preheat the upward combustion air flow through said ash opening.

11. In a stove, comprising:
means defining a combustion chamber;
means for supporting fuel for combustion in said combustion chamber;
an air inlet for supplying a inflow of combustion air to said support means; and
an outlet for the outflow of combustion gases from said combustion chamber;
the improvement comprising:
first air flow constriction means defining a straight horizontal elongate air inlet opening through which said air inlet communicates with said combustion chamber, said air inlet opening being located under said fuel support;
second air flow constriction means defining a straight horizontal elongate combustion gas outlet opening through which said combustion chamber communicates with said outlet;
said outlet opening extending parallel to and being vertically spaced from said inlet opening; and
said support means being adapted to support fuel along the length of said inlet opening; whereby a wide flame is produced on combustion of the fuel; and
a window parallel to the longitudinal directions of said openings, the interior of said combustion chamber being visible through said window from the exterior of said stove.

12. A stove as claimed in claim 11, wherein said combustion chamber defining means comprise a pair of opposed walls and said opposed walls are formed with wall portions having elongate recesses in the exterior surfaces of said wall portions, said inlet and outlet openings being defined by said recessed wall portions.

13. A stove as claimed in claim 12, wherein said wall portions and said support means slope downwardly towards said inlet opening at opposite sides of said inlet opening.

14. A stove as claimed in claim 12, further comprising a window in one of said walls and means for deflecting a portion of the air inflow from said inlet opening and past a surface of said window facing inwardly of said combustion chamber to counteract deposition of combustion products on said window surface and to serve as secondary combustion air.

15. A stove as claimed in claim 13, further comprising a window in one of said walls and means between one of said wall portions and said support means for deflecting a portion of the combustion air upwardly past a surface of said window facing inwardly of said combustion chamber.

16. A stove as claimed in claim 15, further comprising means for variably limiting the inflow of combustion air through said inlet opening.

17. A stove as claimed in claim 16, further comprising means defining an air inlet chamber through which said air inlet communicates with said inlet opening and secondary fuel support means in said inlet chamber for supporting embers dropped through said inlet opening and thereby preheating the combustion air.

18. A stove as claimed in claim 11, further comprising means defining an air inlet chamber through which said air inlet communicates with said inlet opening and secondary fuel support means in said inlet chamber for supporting embers dropped through said inlet opening and thereby preheating the combustion air.

19. A stove as claimed in claim 18, wherein said combustion chamber defining means include a window through which said combustion chamber is visible from the exterior of said stove and means for deflecting a portion of the air preheated by said embers upwardly past said window at a surface of said window facing inwardly of said combustion chamber to heat said window and to counteract the deposition of combustion products on said window surface.

20. A stove as claimed in claim 19, including means for regulating the inflow of the air into said air inlet chamber.

21. A stove as claimed in claim 11, further comprising a window through which said combustion chamber is visible from the exterior of said stove, means for directing a flow of air upwardly past a surface of said window facing inwardly of said combustion chamber and means for preheating said air flow prior to arrival of said air flow at said window surface.

22. A stove as claimed in claim 11, wherein said combustion chamber defining means comprises a window at the front of said stove through which said combustion chamber is visible from the exterior of said stove, and further comprising means extending along said elongate inlet opening for deflecting a portion of the air from the bottom of said combustion chamber upwardly past said window.

23. A stove as claimed in claim 22, wherein said air deflecting means define an air flow passage closely below said fuel support means for preheating said air portion prior to arrival of said air portion at said window.

24. A stove as claimed in claim 11, wherein said inlet comprises an air flow passage extending closely beneath said fuel support means exteriorly of said combustion chamber for preheating of said air prior to entry of said air into said combustion chamber.

25. A stove as claimed in claim 11, further comprising means for variably limiting the inflow of combustion air.

26. A stove as claimed in claim 11, further comprising a heat exchange chamber above said combustion chamber and communicating with said combustion chamber through said outlet opening.

27. A stove as claimed in claim 11, wherein said inlet and outlet openings extend the width of said stove.

28. A stove as claimed in claim 11, further comprising means defining a secondary combustion air outlet in said combustion chamber, said secondary combustion air outlet being of elongate and parallel to said inlet and outlet openings.

29. A stove as claimed in claim 28, further comprising a means for supporting fuel within said combustion chamber and above said opening, and means defining a secondary combustion air passage extending from said inlet opening, closely beneath said fuel support to said secondary combustion air outlet.

30. A stove comprising:
a lower chamber for containing ashes;
an air inlet communicating with said lower chamber;
an upper chamber forming a heat exchanger;
a combustion gas outlet communicating with said upper chamber;
a combustion chamber intermediate said upper and lower chambers;
a fuel inlet opening into said combustion chamber;
a door for closing said fuel inlet;
a first elongate opening between said lower chamber and said combustion chamber;
a second elongate opening between said combustion chamber and said upper chamber;
said stove having an external surface defining elongate recesses in the exterior of said stove between said chambers;
said first and second openings extending between said recesses and being parallel; and
means within said combustion chamber above said first opening for supporting fuel during combustion, said supporting means defining gaps through which ashes and partially combusted fuel can fall through said first opening into said lower chamber;
said first elongate opening being located under said fuel supporting means; and
said first and second openings, said combustion chamber and said upper and lower chambers being elongate widthwise of said stove to form a wide flame in said combustion chamber.

31. A stove as claimed in claim 30, wherein said first and second openings are elongate and narrow relative to said chambers.

32. A stove as claimed in claim 30, wherein said door comprises a transparent window and said combustion chamber contains means for deflecting a portion of an air flow from said first opening upwardly past a surface of said window facing inwardly of said combustion chamber, whereby said deflected air portion counteracts deposition of combustion products on said window surface and effects secondary combustion in an upper portion of said combustion chamber.

33. A stove as claimed in claim 30, further comprising a window in a side wall of said combustion chamber and means for deflecting a portion of an air flow from said first opening upwardly past a surface of said window facing inwardly of said combustion chamber, whereby said deflected air portion counteracts deposition of combustion products on said window surface and effects secondary combustion in an upper portion of said combustion chamber.

34. A stove as claimed in claim 30, further comprising windows in opposite side walls of said combustion chamber and in said door and means for deflecting a portion of an air flow from said first opening upwardly past surfaces of said windows facing inwardly of said combustion chamber, whereby said deflected air portion counteracts deposition of combustion products on said window surfaces and effects secondary combustion in an upper portion of said combustion chamber.

35. A stove as claimed in claim 30, further comprising grating means in said lower chamber for supporting the partially combusted fuel for further combustion and thereby preheating air entering from said air inlet.

36. A stove as claimed in claim 35, wherein said lower chamber comprises an ash drawer and a front opening, said ash drawer having a front wall for closing said front opening and being rearwardly open.

37. A stove as claimed in claim 30, further comprising a water container extending beneath said lower chamber, said water container being upwardly open adjacent the periphery of said lower chamber, whereby water can be provided in said water container to act as a heat shield and for humidification.

38. A stove as claimed in claim 30, further comprising a rotary damper in said air inlet for controlling the entry of combustion air into said lower chamber, said rotary damper comprising a pair of superimposed relatively rotatable circular plates and means defining sector-shaped openings in said plates, said sector-shaped openings each having a first side edge extending radially of the respective one of said plates and a second side edge offset from a radial direction, each of said second side edges of one of said plates co-operating with a respective one of said first side edges of the other of said plates to define a triangular air-flow aperture upon opening of said rotary damper.

39. A stove as claimed in claim 30, wherein said air inlet comprises air duct means communicating with said lower chamber for ducting air thereto, an auxiliary air outlet port in said duct means and bimetallic means for closing said air outlet port, said bimetallic means being responsive to heat from said stove to open said air outlet port.

40. A stove as claimed in claim 30, further comprising damper means in said air inlet for controlling the entry of air into said stove; means for actuating said damper means; and means connecting said actuating means to said damper means; said connecting means comprising fusible means for disconnecting said actuating means from said damper means in response to a predetermined excess heat output from said stove; and means for closing said damper means upon such disconnection.

41. A stove as claimed in claim 40, wherein said actuating means comprise manually operable means for adjusting said damper means, and thermostatically operable means responsive to the heating of said stove for additionally adjusting said damper means, said thermostatically operable means being located in the vicinity of said combustion gas outlet.

42. A stove as claimed in claim 41, wherein said thermostatically operable means extends into said upper chamber.

43. A stove as claimed in claim 41, wherein said thermostatically operable means comprise a housing projecting into said upper chamber and a helical bimetallic strip within said housing, said bimetallic strip having one end connected to said housing and said housing and said bimetallic strip linking said manually operable means to said connecting means.

44. A stove as claimed in claim 30, further comprising bimetallic snap-action means for shaking said fuel support means in response to a predetermined temperature in the vicinity of said bimetallic snap-action means.

45. A stove as claimed in claim 30, further comprising baffle means for partially closing said fuel inlet opening upon opening of said door, means for pivotally supporting said baffle means within said combustion chamber adjacent the top of said fuel inlet opening and linkage means connected to said door for pivotally displacing said baffle means from a raised position to a lowered position, in which said baffle means extends downwardly past a top portion of said fuel inlet opening, on opening of said door.

46. A stove as claimed in claim 30, wherein said air inlet comprises an air inlet and a preheating manifold extending along one of said recesses between said lower chamber and said combustion chamber, and an air inlet opening through which said manifold communicates with said lower chamber.

47. A stove as claimed in claim 30, further comprising an adaptor plate at the rear of said stove for covering a fireplace opening, cold air and combustion gas openings in said plate, and cold air and combustion gas ducts extending through said cold air and combustion gas openings and communicating with said air inlet and said combustion gas outlet, respectively.

48. A stove as claimed in claim 30, wherein said fuel support means comprise replaceable grates shaped to fit the bottom of said combustion chamber and to be self-locatable therein.

49. A stove as claimed in claim 30, further comprising a removable coal grate insertable into said combustion chamber to replace said fuel support means, said coal grate being of cast iron and including a pivotally mounted bottom plate and means for effecting pivoting of said bottom plate from the exterior of said stove.

50. A stove as claimed in claim 30, further comprising air impeller means for producing an air flow at the exterior of said stove and thermostatically operable means responsive to the temperature of said stove for controlling the operation of said air impeller means.

51. A stove as claimed in claim 30, further comprising heat exchanger means removably attachable to said stove for effecting heat exchange between combustion gases within said stove and the ambient atmosphere, said heat exchanger means comprising duct means for guiding the combustion gases through said heat exchanger means to said gas outlet and movable baffle means for deflecting the combustion gas to selectively bypass said duct means.

52. A stove as claimed in claim 30, further comprising a heat exchanger mounted on said upper chamber and means for deflecting combustion gas from said upper chamber through said heat exchanger to said combustion gas outlet.

53. A stove as claimed in claim 30, further comprising laterally projecting dome-shaped members closing openings in opposite sides of said combustion chamber.

54. A stove as claimed in claim 30, wherein said door is provided with handle means to facilitate opening and closing of said door, said handle means comprising a generally horizontal guard extending in front of, along and spaced from said door.

55. A stove as claimed in claim 30, wherein said fuel support means include a refractory lining cast in place in said combustion chamber.

56. A stove as claimed in claim 55, including a metal reinforcement in said lining.

* * * * *